(12) United States Patent
Van Der Veen et al.

(10) Patent No.: US 6,392,361 B2
(45) Date of Patent: May 21, 2002

(54) MICROPROCESSOR BASED SWITCHING DEVICE FOR ENERGIZING A LAMP

(75) Inventors: Geert Willem Van Der Veen; Everaard Marie Jozef Aendekerk, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/778,893

(22) Filed: Feb. 7, 2001

(30) Foreign Application Priority Data

Feb. 10, 2000 (EP) .............................. 00200439

(51) Int. Cl.[7] .............................................. H05B 37/02
(52) U.S. Cl. .................... 315/209 R; 315/224; 315/291
(58) Field of Search ................................. 315/224, 225, 315/291, 307, 209 R, DIG. 4

(56) References Cited

U.S. PATENT DOCUMENTS

| | | | | |
|---|---|---|---|---|
| 5,872,429 A | * | 2/1999 | Xia et al. | 315/DIG. 4 |
| 6,133,696 A | * | 10/2000 | Tavares et al. | 315/209 R |
| 6,316,882 B1 | * | 11/2001 | Choi et al. | 315/291 |

FOREIGN PATENT DOCUMENTS

| WO | WO9901013 | 1/1999 | H05B/41/00 |
|---|---|---|---|

* cited by examiner

*Primary Examiner*—David Vu
*Assistant Examiner*—Wilson Lee

(57) ABSTRACT

In a ballast circuit for operating a lamp, which comprises a bridge circuit and a control circuit for controlling the bridge switches, the control circuit comprises a microprocessor. The control signal for controlling the switches is generated by a separate circuit comprising a signal generator, a timer, two comparators and two reference signal generators. The microprocessor is used only to set the reference signals to the desired values, thereby dimming the lamp.

6 Claims, 2 Drawing Sheets

MICROPROCESSOR BASED SWITCHING DEVICE FOR ENERGIZING A LAMP

BACKGROUND OF THE INVENTION

The invention relates to a switching device for energizing a lamp, comprising
  input terminals which are to be connected to the poles of a supply-voltage source,
  a DC-AC converter for generating a high-frequency lamp current of frequency f from a supply voltage supplied by the supply-voltage source, which DC-AC converter comprises
    a branch including a series arrangement of a first and a second switching element, respective ends of which are coupled to the input terminals,
    a control circuit including a microprocessor for rendering the first and the second switching element alternately conducting and non-conducting, which control circuit is provided with a dim circuit having
    a timer for adjusting a first time interval, during which the first switching element is conducting, and for adjusting a second time interval, during which the second switching element is conducting.

The invention also relates to a control circuit for use in such a switching device.

A switching device of the type mentioned in the opening paragraph is known from WO 99/01013. As the control circuit comprises a microprocessor, many different functions of the switching device can be implemented in the control circuit, which, in spite of that, can be embodied so as to be comparatively small. For example, the known switching device enables the luminous flux of the lamp to be adjusted at a desired value by influencing the conduction times of the switching elements. To achieve this, software is employed enabling a number to be set in the timer by the microprocessor, the value of said number being a measure of the desired conduction time of a switching element or a measure of the desired length of a time interval during which the switching elements are both non-conducting. Subsequently, the contents of the timer is reduced to zero by the microprocessor in a number of steps that is equal to the number set in the timer. When the value of the number in the timer has been reduced to zero by the software, one of the switching elements is rendered conducting or non-conducting. A drawback of this method of dimming a lamp energized by means of the switching device resides in that the resolution of the time intervals adjusted by means of the timer is determined by the time needed by the microprocessor to execute a command originating from the software. Unless use is made of a very expensive microprocessor, this means in practice that the resolution is comparatively poor. As a result, the number of levels of the luminous flux of the lamp that can be adjusted by means of the control circuit is comparatively small. A further drawback of the known switching device resides in that, during stationary operation, the microprocessor almost continuously determines conduction times of switching elements and/or time intervals during which both switching elements are non-conducting. As a result of this further drawback, the capacitance that remains to execute other functionalities, such as control functions etc, is very limited.

SUMMARY OF THE INVENTION

It is an object of the invention to provide a switching device by means of which the luminous flux of a lamp energized using the switching device can be adjusted at a comparatively large number of values, while, apart from controlling the conduction times of the switching elements, the microprocessor is capable of carrying out a large number of other functions during stationary operation.

To achieve this, a switching device of the type mentioned in the opening paragraph is characterized in accordance with the invention in that an input of the timer is connected to a signal generator for generating a signal whose frequency is higher than the clock rate of the microprocessor, and in that the timer is provided with a reset circuit for resetting the timer with a frequency $2*f$, and in that the dim circuit further comprises
  a first comparator, a first input of which is coupled to an output of the timer, and a second input is coupled to an output of a first reference circuit for generating a signal which is a measure of a desired value of the first time interval, and an output of which comparator is coupled to a control electrode of the first switching element,
  a second comparator, a first input of which is coupled to the output of the timer, and a second input is coupled to an output of a second reference circuit for generating a signal which is a measure of a desired value of the second time interval, and an output of which comparator is coupled to a control electrode of the second switching element.

In a switching device in accordance with the invention, the contents of the timer is changed with the frequency of the signal generator. This frequency is independent of the clock frequency of the microprocessor and can be selected so as to be much higher than said clock frequency. This comparatively high frequency of the signal from the signal generator results in a comparatively high resolution of the time intervals determined by means of the timer. As a result of this high resolution, the luminous flux of the lamp can be set to a comparatively large number of values.

In a preferred embodiment of a switching device in accordance with the invention, an input of the first reference circuit and an input of the second reference circuit are coupled to the microprocessor. In this preferred embodiment, the output signals of the first and the second reference circuit, and hence the conduction times of the first and the second switching element, can be adjusted by means of the microprocessor.

Satisfactory results have also been obtained in examples of a switching device in accordance with the invention, wherein an input of the timer is coupled to the output of a reset circuit, and an input of the reset circuit is coupled to the microprocessor. In such examples, the reset circuit resets the timer with a frequency f, which can be set via the microprocessor.

To preclude that both switching elements become conducting at the same time, the control circuit of a switching device in accordance with the invention is preferably provided with a coupling-circuit part which is used for
  maintaining, during a third time interval having a duration $1/(2*f)$, an electric connection between the output of the first comparator and the control electrode of the first switching element, and for interrupting an electric connection between the output of the second comparator and the control electrode of the second switching element, and for
  maintaining, during a fourth time interval having a duration $1/(2*f)$, an electric connection between the output of the second comparator and the control electrode of the second switching element, and for interrupting an electric connection between the output of the first comparator and the control electrode of the first switching element. Said first time interval forms part of the third time interval and said second time interval forms part of the fourth time interval. In the third time interval, the first switching element is conducting during a time interval which is equal to the first time interval. During the remaining part of the third time interval, the first switching element is non-conducting. The second switching element is non-conducting during the whole third time interval. Correspondingly, in the fourth time interval, the second switching element is conducting during a time interval which is equal to the second time interval. During the remaining part of the fourth time interval, the second switching element is non-conducting. The first switching element is non-conducting during the whole fourth time interval. In an advantageous embodiment of such a coupling-circuit part, the coupling-circuit part comprises a bistable multivibrator, an input of which is coupled to an output of the timer, a first and gate, a first input of which is coupled to a first output of the bistable multivibrator, a second input of which is coupled to the output of the first comparator, and an output of which is coupled to the control electrode of the first switching element, and a second and gate, a first input of which is coupled to a second output of the bistable multivibrator, a second input of which is coupled to the output of the second comparator, and an output of which is coupled to the control electrode of the second switching element.

In this manner, the coupling-circuit part is formed in a comparatively simple and reliable manner.

Preferably, the microprocessor, the timer, the first reference circuit, the second reference circuit and the coupling-circuit part of a control circuit of a switching device in accordance with the invention are integrated in an IC. As a result, the control circuit, and hence the switching device in accordance with the invention, can be embodied so as to be comparatively compact.

These and other aspects of the invention will be apparent from and elucidated with reference to the embodiment(s) described hereinafter.

DETAILED DESCRIPTION OF THE PREFERRED EMBODIMENTS

Figure 1:
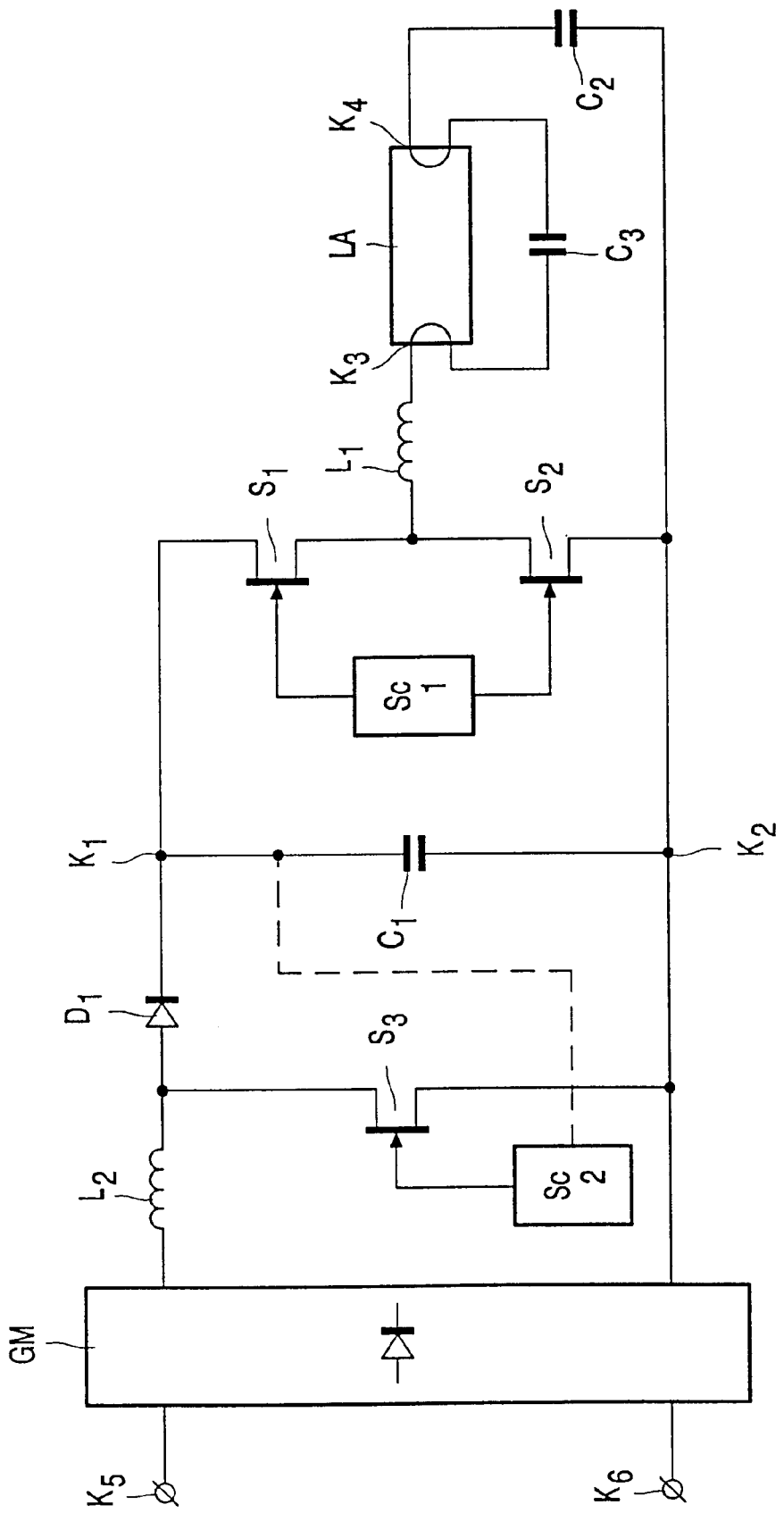
FIG. 1 shows an example of a switching device in accordance with the invention to which a lamp La is connected.

In FIG. 1, K5 and K6 are terminals which are to be connected to the poles of an AC voltage source, such as mains voltage. The terminals K5 and K6 are connected to respective input terminals of rectifier means GM for rectifying an AC voltage supplied by the AC voltage source. A first output terminal of the rectifier means GM is connected to a second output terminal of the rectifier means GM by means of a series arrangement of a coil L2 and a switching element S3. The switching element S3 is shunted by a series arrangement of diode D1 and capacitor C1. A control electrode of the switching element S3 is connected to an output of a circuit part SC2. An input of the circuit part SC2 is connected to a junction point of diode D1 and capacitor C1. Circuit part SC2 is a circuit part used for rendering switching element S3 conducting and non-conducting. Coil L2, diode D1, switching element S3, circuit part SC2 and capacitor C1 jointly form a DC-DC converter. This DC—DC converter generates, during operation of the switching device, a substantially constant DC voltage from the rectified AC voltage. This substantially constant DC voltage is present across capacitor C1. The operation and the dimensions of such a DC—DC converter are known in the art of lighting electronics. The AC voltage source, the rectifier means GM and the DC—DC converter jointly form a supply-voltage source. This supply-voltage source supplies a supply voltage, which is formed by the substantially constant DC voltage present across capacitor C1. Capacitor C1 is shunted by a series arrangement of switching elements S1 and S2. In this example, respective ends of this series arrangement form input terminals K1 and K2, which are to be connected to a supply-voltage source. Control electrodes of switching elements S1 and S2 are connected to respective outputs of circuit part SC1, which in this example forms a control circuit for rendering the first and the second switching element alternately conducting and non-conducting. Circuit part SC1 and switching elements S1 and S2 jointly form a DC-AC converter for generating a high-frequency lamp current of frequency f from the supply voltage. Switching element S2 is shunted by a series arrangement of coil L1, lamp terminal K3, discharge lamp La, lamp terminal K4 and capacitor C2. Lamp terminals K3 and K4 are terminals for accommodating a lamp to be energized by the switching device. Lamp terminals K3 and K4 are interconnected by means of a capacitor C3. Coil L1, lamp terminals K3 and K4, lamp La and capacitors C2 and C3 jointly form a load branch of the DC-AC converter.

The operation of the example shown in FIG. 1 is as follows.

If terminals K5 and K6 are connected to an AC voltage source, the rectifier means GM rectify the AC voltage supplied by the AC voltage source, and circuit part SC2 renders the switching element S3 alternately conducting and non-conducting. In this manner, the DC—DC converter generates a substantially constant DC voltage from the rectified AC voltage, which DC voltage is present across capacitor C1. Circuit part SC1 renders the switching elements S1 and S2 alternately conducting and non-conducting with a frequency f. As a result, a substantially square-wave voltage of frequency f is applied across the load branch. This substantially square-wave voltage causes a high-frequency current of frequency f to flow in the load branch, so that a high-frequency current of frequency f also flows through the lamp La. The control circuit is provided with a dim circuit for adjusting the luminous flux of the lamp La. This luminous flux is adjusted by setting a first time interval during which the first switching element S1 is conducting, and setting a second time interval during which the second switching element S2 is conducting. The way in which the first and the second time interval are set will be elucidated with reference to FIG. 2.

Figure 2:
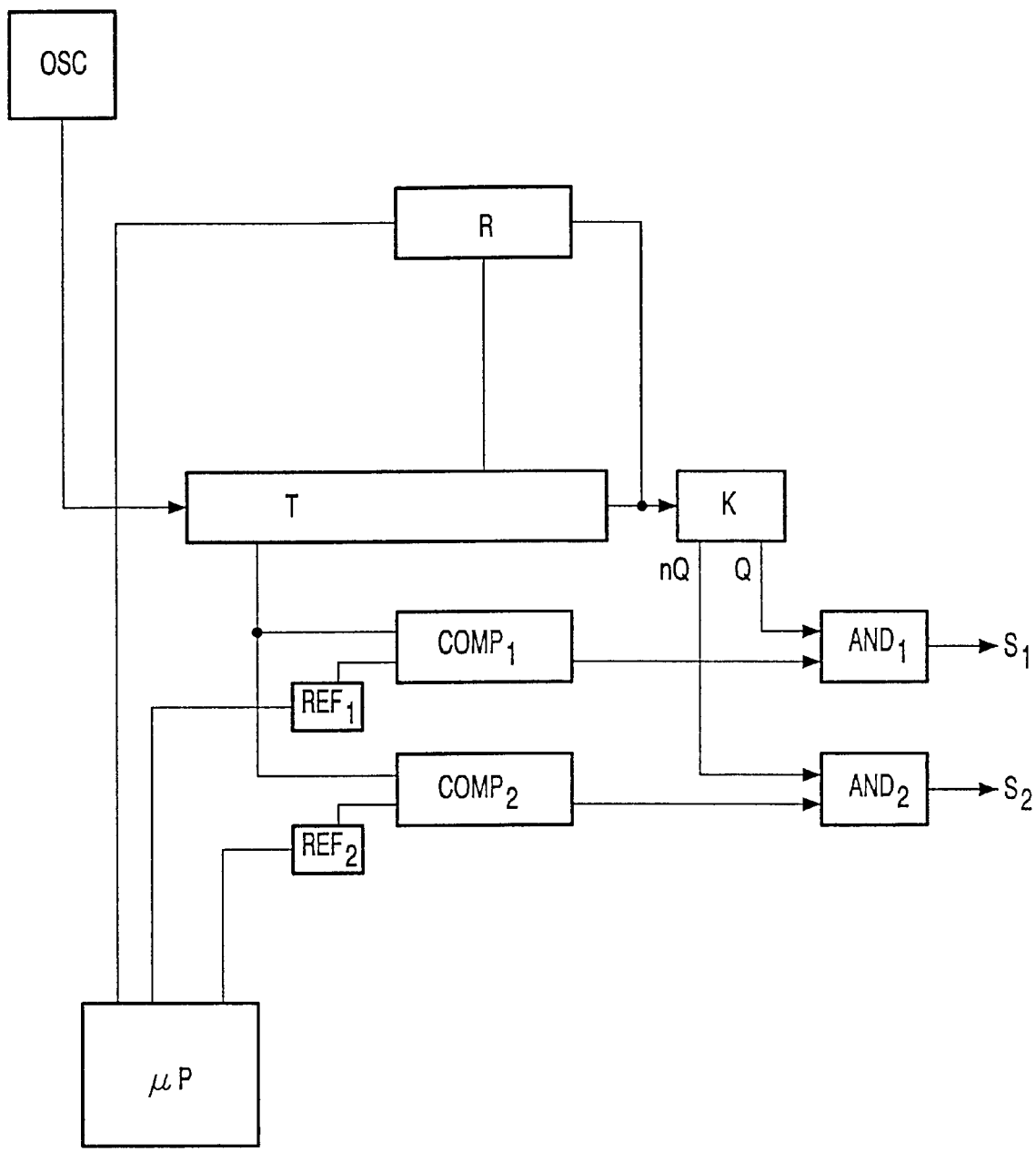
FIG. 2 is a more detailed view of the control circuit of the example shown in FIG. 1.

In FIG. 2, $\mu P$ is a microprocessor which forms part of the control circuit. A first output of microprocessor $\mu P$ is connected to an input of circuit part Ref1. A second output of microprocessor $\mu P$ is connected to an input of circuit part Ref2. Circuit part Ref1 forms a first reference circuit for generating a signal, which is a measure of a desired value of the first time interval. Circuit part Ref2 forms a second reference circuit for generating a signal, which is a measure of a desired value of the second time interval. An output of circuit part Ref1 is connected to a first input of comparator COMP1. A second input of comparator COMP1 is connected to a first output of the timer T. An output of comparator COMP1 is connected to a first input of AND gate AND1. An output of AND gate AND1 is connected to a control electrode of switching element S1. An output of circuit part Ref2 is connected to a first input of comparator COMP2. A second input of comparator COMP2 is connected to the first output of the timer T. An output of comparator COMP2 is connected to a first input of AND gate AND2. An output of AND gate AND2 is connected to a control electrode of switching element S2. A first input of timer T is connected to an output of signal generator OSC for generating a signal having a higher frequency than the clock rate of microprocessor $\mu P$. An input of bistable multivibrator K is connected to a second output of timer T. The second output of timer T is also connected to a first input of reset circuit R for resetting timer T with a frequency $2*f$. A second input of reset circuit R is connected to a third output of the microprocessor $\mu P$ for adjusting the frequency f with the microprocessor $\mu P$. An output of the reset circuit R is connected, for this purpose, to a second input of timer T. A first output of bistable multivibrator K is connected to a second input of AND gate AND1. A second output of bistable multivibrator K is connected to a second input of AND gate AND2. The bistable multivibrator K and the first and the second AND gate jointly form, in this example, a coupling-circuit part for alternately maintaining and interrupting, at(?) a frequency f, the electric connections between the outputs of the comparators COMP1 and COMP2 and, respectively, the first switching element S1 and the second switching element S2.

The operation of the control circuit shown in FIG. 2 is as follows.

During operation of the switching device, the signal generator OSC generates a periodic signal having a comparatively high frequency. During a reset, the reset circuit R makes the contents of the timer equal to a predetermined value corresponding to the frequency $2*f$. From this moment, the value of the number in the timer is equal, at any instant, during a time interval of $1/(2*f)$ to the predetermined value minus the number of periods of the periodic signal after the latest timer reset. Reference circuit Ref1 generates a signal, which is a measure of a desired value of the first time interval. As long as the contents of the timer is higher than the signal generated by reference circuit Ref1, the output of comparator COMP1 is high. As soon as the contents of the timer becomes equal to the signal generated by reference circuit Ref1, the output of comparator COMP1 changes from high to low. The contents of the timer decreases further and the output of comparator COMP1 remains low until a time interval $1/(2*f)$ has elapsed after the latest timer reset. The instant at which the contents of the timer is zero and a time interval $1/(2*f)$ has elapsed since the latest timer reset, the reset circuit R resets the timer, which means that the contents of the timer is made equal to the predetermined value. After resetting the timer, the contents of the timer decreases again, and the output of comparator COMP1 is high again. Similarly, the output of comparator COMP2 is high at first during each time interval of $1/(2*f)$, until the contents of the timer is equal to the signal generated by the reference circuit Ref2. After that, the output of comparator COMP2 changes from high to low. At each timer reset, a pulse is generated on the second output of the timer and hence on the input of the bistable multivibrator K. If the first output of the bistable multivibrator K is high, then the second output is low. After a pulse on the input of the bistable multivibrator K, the first output changes from high to low and the second output changes from low to high. A subsequent pulse causes the first output to change from low to high and the second output from high to low. As a result, during successive time intervals of $1/(2*f)$, the first switching element S1 and the second switching element S2 are alternately rendered conducting during, respectively, the time interval wherein the output of comparator COMP1 is high and the time interval wherein the output of comparator COMP2 is high. Via the microprocessor $\mu P$, the value of the signal generated by the first reference circuit and/or the value of the signal generated by the second reference circuit can be adjusted. These values may be chosen to be equal or different. If these values are chosen to be different, it becomes possible to adjust the luminous flux of the lamp at many different levels. The value of the frequency $2*f$ can also be adjusted via the microprocessor $\mu P$ by adjusting the predetermined value to which the contents of the timer is made equal at each reset. Apart from adjusting the value of the reference signals and the frequency $2*f$, the microprocessor $\mu P$ plays no part in generating control signals. As a result, the microprocessor is substantially completely available for fulfilling other functions of the switching device. As the frequency of the signal generated by the signal generator OSC is comparatively high, also the resolution of the conduction times of the switching elements set by means of the control circuit is high, so that the luminous flux of the lamp can be adjusted at many different values.

What is claimed is:

1. A switching device for energizing a lamp, comprising input terminals which are to be connected to the poles of a supply-voltage source,
 a DC-AC converter for generating a high-frequency lamp current of frequency f from a supply voltage supplied by the supply-voltage source, which DC-AC converter comprises
  a branch including a series arrangement of a first and a second switching element, respective ends of which are coupled to the input terminals,
  a control circuit including a microprocessor for rendering the first and the second switching element alternately conducting and non-conducting, which control circuit is provided with a dim circuit having a timer for adjusting a first time interval, during which the first switching element is conducting, and for adjusting a second time interval during which the second switching element is conducting,
characterized in that an input of the timer is connected to a signal generator for generating a signal whose frequency is higher than the clock rate of the microprocessor, and in that the timer is provided with a reset circuit for resetting the timer with a frequency $2*f$, and in that the dim circuit further comprises
 a first comparator, a first input of which is coupled to an output of the timer, and a second input is coupled to an output of a first reference circuit for generating a signal which is a measure of a desired value of the first time interval, and an output of which comparator is coupled to a control electrode of the first switching element,
 a second comparator, a first input of which is coupled to the output of the timer, and a second input is coupled to an output of a second reference circuit for generating a signal which is a measure of a desired value of the second time interval, and an output of which comparator is coupled to a control electrode of the second switching element.

2. The switching device as claimed in claim 1, wherein an input of the first reference circuit and an input of the second reference circuit are coupled to the microprocessor.

3. The switching device as claimed in claim 1 or 2, wherein an input of the timer is coupled to the output of a reset circuit, and an input of the reset circuit is coupled to the microprocessor.

4. The switching device as claimed in claim 1, wherein the control circuit comprises a coupling-circuit part which is used for maintaining, during a third time interval having a duration ½*f, an electric connection between the output of the first comparator and the control electrode of the first switching element, and for interrupting an electric connection between the output of the second comparator and the control electrode of the second switching element, and for maintaining, during a fourth time interval having a duration ½*f, an electric connection between the output of the second comparator and the control electrode of the second switching element, and for interrupting an electric connection between the output of the first comparator and the control electrode of the first switching element.

5. The switching device as claimed in claim 4, wherein the coupling-circuit part comprises a bistable multivibrator, an input of which is coupled to an output of the timer, a first and gate, a first input of which is coupled to a first output of the bistable multivibrator, a second input of which is coupled to the output of the first comparator, and an output of which is coupled to the control electrode of the first switching element, and a second and gate, a first input of which is coupled to a second output of the bistable multivibrator, a second input of which is coupled to the output of the second comparator, and an output of which is coupled to the control electrode of the second switching element.

6. The switching device as claimed in claim 4, wherein the microprocessor, the timer, the first reference circuit, the second reference circuit and the coupling-circuit part are integrated in an IC.

* * * * *